United States Patent
Fairman et al.

(10) Patent No.: US 7,318,090 B1
(45) Date of Patent: Jan. 8, 2008

(54) METHOD FOR UTILIZING CONCURRENT CONTEXT SWITCHING TO SUPPORT ISOCHRONOUS PROCESSES

(75) Inventors: Bruce A Fairman, Woodside, CA (US); Glen D. Stone, Los Gatos, CA (US); Scott D. Smyers, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1140 days.

(21) Appl. No.: 09/661,226

(22) Filed: Sep. 13, 2000

Related U.S. Application Data

(60) Provisional application No. 60/160,640, filed on Oct. 20, 1999.

(51) Int. Cl.
  G06F 15/173 (2006.01)
  G06F 3/00 (2006.01)
  G06F 9/46 (2006.01)
(52) U.S. Cl. .................... 709/223; 710/21; 718/108
(58) Field of Classification Search ............... 718/107, 718/108, 100; 712/227, 228, 42; 710/21, 710/22; 709/223
See application file for complete search history.

(56) References Cited

U.S. PATENT DOCUMENTS

| | | | | |
|---|---|---|---|---|
| 5,329,615 A | * | 7/1994 | Peaslee et al. ............... | 345/502 |
| 5,349,687 A | | 9/1994 | Ehlig et al. .................. | 395/800 |
| 5,528,513 A | * | 6/1996 | Vaitzblit et al. ............ | 718/103 |
| 5,586,264 A | * | 12/1996 | Belknap et al. ............. | 725/115 |
| 5,600,837 A | | 2/1997 | Artieri ........................ | 395/673 |
| 5,613,114 A | * | 3/1997 | Anderson et al. ........... | 718/108 |
| 5,694,333 A | * | 12/1997 | Andrade et al. .............. | 710/26 |
| 5,815,678 A | | 9/1998 | Hoffman et al. ............ | 395/309 |
| 5,944,816 A | * | 8/1999 | Dutton et al. ............... | 712/215 |
| 5,961,585 A | | 10/1999 | Hamlin ........................ | 709/108 |

(Continued)

FOREIGN PATENT DOCUMENTS

EP 0285310 3/1988

(Continued)

OTHER PUBLICATIONS

Kreuzinger, J.; Ungerer, T.; "Context-switching techniques for decoupled multithreaded processors" EUROMICRO Conference, 1999, Proceedings. 25th , vol. 1 , Sep. 8-10, 1999 pp. 248-251 vol. 1.*

(Continued)

*Primary Examiner*—George C. Neurauter, Jr.
(74) *Attorney, Agent, or Firm*—Gregory J. Koerner; Redwood Patent Law

(57) ABSTRACT

A method for utilizing concurrent context switching to support isochronous processes preferably comprises a main context that is configured to support system execution tasks, a first concurrent context that supports a first set of concurrent execution and loading procedures, and a second concurrent context that supports a second set of concurrent execution and loading procedures. A context control module preferably manages switching and loading procedures between the main context, the first concurrent context, and the second concurrent context. The context control module may perform successive concurrent context switching procedures by alternating between the first concurrent context and the second concurrent context to thereby sequentially support any desired number of isochronous processes.

52 Claims, 10 Drawing Sheets

U.S. PATENT DOCUMENTS

| | | | | |
|---|---|---|---|---|
| 6,029,242 | A * | 2/2000 | Sidman | 712/42 |
| 6,061,711 | A * | 5/2000 | Song et al. | 718/108 |
| 6,360,243 | B1 * | 3/2002 | Lindsley et al. | 718/103 |
| 6,401,149 | B1 * | 6/2002 | Dennin et al. | 710/58 |
| 6,430,593 | B1 * | 8/2002 | Lindsley | 718/103 |
| 6,519,265 | B1 * | 2/2003 | Liu et al. | 370/463 |
| 6,567,839 | B1 * | 5/2003 | Borkenhagen et al. | 718/103 |
| 6,629,237 | B2 * | 9/2003 | Wolrich et al. | 712/228 |
| 6,651,163 | B1 * | 11/2003 | Kranich et al. | 712/244 |
| 6,732,235 | B1 * | 5/2004 | Krivacek et al. | 711/118 |
| 6,986,141 | B1 * | 1/2006 | Diepstraten et al. | 718/108 |

FOREIGN PATENT DOCUMENTS

| | | |
|---|---|---|
| EP | 0622732 | 4/1994 |
| EP | 0649090 | 10/1994 |
| EP | 0697651 | 8/1995 |
| GB | 2216307 | 10/1989 |

OTHER PUBLICATIONS

Kekckler, S.W.; Chang, A.; Chatterjee, W.S.L.S.; Dally, W.J.; "Concurrent event handling through multithreading" Computers, IEEE Transactions on , vol. 48, Issue: 9 , Sep. 1999 pp. 903-916.*

Dean, A.G.; Shen, J.P.; "Techniques for software thread integration in real-time embedded systems" Real-Time Systems Symposium, 1998. Proceedings., The 19th IEEE , Dec. 2-4, 1998 pp. 322-333.*

Fiske, S.; Dally, W.J.; "Thread prioritization: a thread scheduling mechanism for multiple-context parallel processors" High-Performance Computer Architecture, 1995. Proceedings. First IEEE Symposium on , Jan. 22-25, 1995 pp. 210-221.*

Register Relocation: Flexible Contexts for Multithreading, MIT Laboratory for Computer Science, Waldspurger, C., Weihl, W., p. 120-p. 130, Jun. 5, 1993.

Register Banking For IBM System/370, IBM Technical Disclosure Bulletin, vol. 334, No. 4B, p. 372-p. 373, Sep. 1991.

A 26-Bit Microprocessor With Multi-Register Bank Architecture, Hitachi Research Laboratory, p. 1014-p. 1019, Feb. 11, 1986.

General Purpose Register Extension, IBM Technical Disclosure Bulletin, vol. 24, No. 3, p. 1404-p. 1405, Aug. 1981.

Shifting Register Windows, 8207 IEEE Micro, Russell, G., Shaw, P., p. 28-p. 35, Mar. 1993.

Real-Time Application, High Performance Systems, Goering R., p. 19, 22, 24, 28-29, Mar. 1990.

* cited by examiner

METHOD FOR UTILIZING CONCURRENT CONTEXT SWITCHING TO SUPPORT ISOCHRONOUS PROCESSES

CROSS-REFERENCE TO RELATED APPLICATION

This application is related to, and claims priority in, co-pending U.S. Provisional Patent Application Ser. No. 60/160,640, entitled "Concurrent Context Switching," filed on Oct. 20, 1999. The related application is commonly assigned, and is hereby incorporated by reference.

BACKGROUND SECTION

1. Field of the Invention

This invention relates generally to techniques for managing processor operations, and relates more particularly to a method for utilizing concurrent context switching to support isochronous processes.

2. Description of the Background Art

Implementing effective methods for managing processor operations is a significant consideration for designers and manufacturers of contemporary electronic devices. An electronic device in an electronic network may advantageously communicate with other electronic devices in the network to share data to thereby substantially increase the capabilities and versatility of individual devices in the electronic network. For example, an electronic network may be implemented in a home environment to enable flexible and beneficial sharing of data and device resources between various consumer electronic devices, such as personal computers, digital versatile disc (DVD) devices, digital set-top boxes for digital broadcasting, enhanced television sets, and audio reproduction systems.

Effectively managing processor operations in a network of electronic devices may create substantial challenges for designers of electronic networks. For example, enhanced demands for increased device functionality and performance during data transfer operations may require more system processing power and require additional hardware resources across the network. An increase in processing or hardware requirements may also result in a corresponding detrimental economic impact due to increased production costs and operational inefficiencies.

Furthermore, enhanced device capability to perform various advanced processor operations may provide additional benefits to a system user, but may also place increased demands on the control and management of the various devices in the electronic network. For example, an enhanced electronic network that effectively accesses, processes, and displays digital television programming may benefit from efficient processing techniques because of the large amount and complexity of the digital data involved.

One type of process that may occur in an electronic device is an isochronous process. Isochronous processes include the guaranteed handling of data that arrives in a time-based stream at regular intervals called cycles. Isochronous processes are typically used for time-sensitive applications. For example, video or audio data being transmitted across a network typically needs to arrive at a display device in an uninterrupted flow with appropriate timing.

Due to growing demands on system processing resources and substantially increasing data magnitudes, it is apparent that developing new and effective methods for managing processor operations is a matter of significant concern for the related electronic technologies. Therefore, for all the foregoing reasons, implementing effective methods for efficiently managing processor operations remains a significant consideration for designers, manufacturers, and users of contemporary electronic devices.

SUMMARY

In accordance with the present invention, a system and method are disclosed for utilizing a concurrent context switching procedure to support isochronous processes. In the embodiment of the present invention discussed in the present summary, three isochronous processes are supported by the concurrent context switching procedure. However, in alternate embodiments, any desired number of isochronous processes may utilize the concurrent context switching procedure, in accordance with the present invention.

In one embodiment, a central-processing unit (CPU) of an electronic device may initially execute various non-isochronous system tasks in a main context using a main register set. For purposes of illustration, it is assumed that three isochronous processes have already been instantiated and that a first set of information for a first isochronous process has been preloaded into a first concurrent register set that corresponds to a first concurrent context.

Next, a context control module from the CPU preferably waits for the occurrence of an isochronous exception. The isochronous exception may preferably be triggered by an isochronous clock pulse from a network interface to thereby indicate the start of a new isochronous cycle. In response to the foregoing isochronous exception, the CPU preferably interrupts system execution in the main context, and the context control module preferably then causes a context selector to switch processor contexts to the first concurrent context.

The CPU then preferably executes the preloaded first isochronous process, and, concurrently, the context control module preferably causes a context direct-memory access module (context DMA) to load a second set of information for a second isochronous process into a second concurrent register set that corresponds to a second concurrent context. The CPU then determines whether the first isochronous process has completed execution.

If the first isochronous process has completed execution, then the context control module preferably causes the context selector to switch processor contexts to the second concurrent context. Next, the CPU preferably executes the second isochronous process, and, concurrently, the context control module preferably causes the context DMA to load a third set of information for a third isochronous process into the first concurrent register set of the first concurrent context.

Next, the CPU preferably determines whether the foregoing second isochronous process has completed execution. If the second isochronous process has completed execution, then the context control module preferably causes the context selector to switch processor contexts to the first concurrent context. The CPU then preferably executes the third isochronous process.

In situations in which more than three isochronous processes have been instantiated, the context control module may readily perform a similar extended concurrent context switching procedure by alternating between the first concurrent context and the second concurrent context to thereby support any number of isochronous processes in the manner previously discussed for the foregoing three isochronous processes.

In the present embodiment, the CPU next preferably determines whether the third isochronous process has completed execution. If the third isochronous process has completed execution, then the context control module preferably causes the context selector to switch processor contexts to the main context. The context control module then preferably directs the context DMA to load a new first set of information for the first isochronous process into the first concurrent register set.

Finally, the CPU preferably generates a return from the foregoing isochronous exception, and recommences execution of non-isochronous tasks. The context control module of the CPU then preferably waits for the occurrence of another isochronous exception to retrigger the concurrent context procedure, in accordance with the present invention. The present invention thus provides an improved system and method for utilizing concurrent context switching to support isochronous processes.

DETAILED DESCRIPTION

The present invention relates to an improvement in processing management techniques. The following description is presented to enable one of ordinary skill in the art to make and use the invention and is provided in the context of a patent application and its requirements. Various modifications to the disclosed embodiments will be readily apparent to those skilled in the art and the generic principles herein may be applied to other embodiments. Thus, the present invention is not intended to be limited to the embodiments shown, but is to be accorded the widest scope consistent with the principles and features described herein.

The present invention comprises a method for utilizing concurrent context switching to support isochronous processes, and preferably includes a main context that is configured to support non-isochronous system execution tasks, a first concurrent context that supports a first set of concurrent execution and loading procedures, and a second concurrent context that supports a second set of concurrent execution and loading procedures.

A context control module preferably manages switching and loading procedures between the main context, the first concurrent context, and the second concurrent context. The context control module may perform successive concurrent context switching procedures by alternating between the first concurrent context and the second concurrent context to thereby sequentially support any desired number of isochronous processes.

Figure 1:
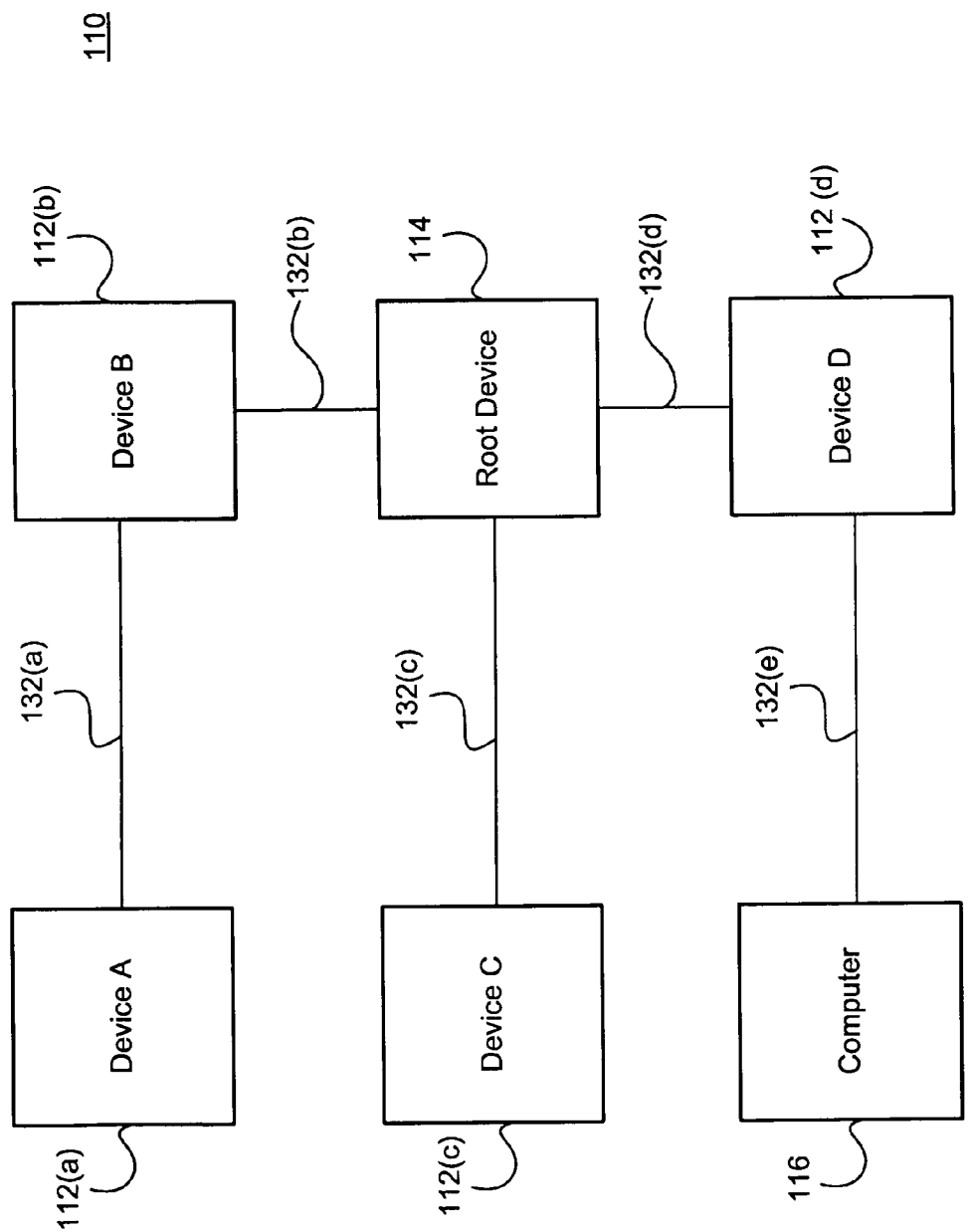
FIG. 1 is a block diagram for one embodiment of an electronic network, in accordance with the present invention.

Referring now to FIG. 1, a block diagram for one embodiment of an electronic network 110 is shown, according to the present invention. In the FIG. 1 embodiment, network 110 preferably comprises, but is not limited to, a number of electronic devices (device A 112(*a*), device B 112(*b*), device C 112(*c*), device D 112(*d*), and device E 112(*e*)), and computer 116. In alternate embodiments, electronic network 110 may readily be configured to include various other devices or components in addition to, or instead of, those discussed in conjunction with the FIG. 1 embodiment. In alternate embodiments, network 110 may readily be connected and configured in any other appropriate and suitable manner.

In the FIG. 1 embodiment, devices 112 and computer 116 of network 110 may alternately be implemented as any type of electronic device, including, but not limited to, personal computers, printers, digital video disc devices, television sets, audio systems, video cassette recorders, and set-top boxes for digital broadcasting. In the FIG. 1 embodiment, devices 112 and computer 116 preferably communicate with one another using a network bus 132. Network bus 132 preferably includes path 132(*a*), path 132(*b*), path 132(*c*), path 132(*d*), and path 132(*e*). For example, device B 112(*b*) is coupled to device A 112(*a*) via path 132(*a*), and to device E (112*e*) via path 132(*b*). Similarly, device E (112(*e*) is coupled to device C 112(*c*) via path 132(*c*), and to device D 112(*d*) via path 132(*d*). In addition, device D 112(*d*) is coupled to computer 116 via path 132(*e*). In the FIG. 1 embodiment, network bus 132 is preferably implemented using an IEEE Std 1394 Standard for a High Performance Serial Bus, which is hereby incorporated by reference. However, in alternate embodiments, network 110 may readily communicate and function using various other network interconnectivity methodologies, which are equally within the scope of the present invention.

In the FIG. 1 embodiment, certain devices 112 and/or computer 116 in electronic network 110 may communicate with other devices 112 and/or computer 116 within network 110. For example, computer 116 may communicate with device B 112(*b*) by transmitting data via cable 132(*e*) to device D 112(*d*), which may then transmit the transfer data via cable 132(*d*) to device E (112(*e*). In response, device E 112(*e*) then may transmit the transfer data to device B 112(*b*) via cable 132(*b*).

Figure 2:
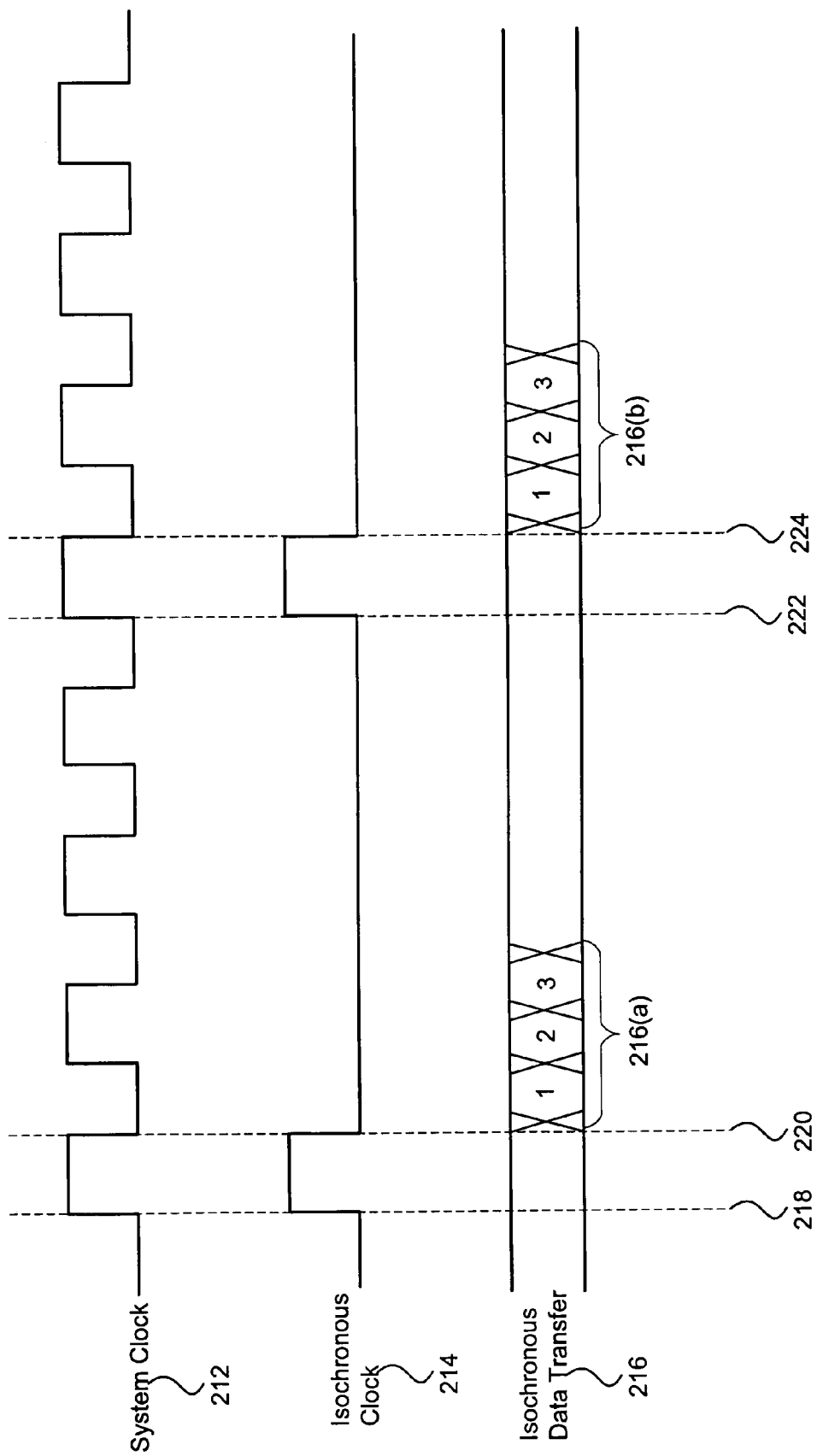
FIG. 2 is a timing diagram for one embodiment of exemplary isochronous data transfers, in accordance with the present invention.

Referring now to FIG. 2, a timing diagram for one embodiment of exemplary isochronous data transfers is shown, in accordance with one embodiment of the present invention. The FIG. 2 timing diagram includes a system clock 212, an isochronous clock signal 214, and an isochronous data transfer signal 216. In FIG. 2, at time 218, a first isochronous clock pulse 214 changes state in synchronization with system clock 212. At time 220, the isochronous clock pulse 214 changes state again, and isochronous data transfer 216(*a*) responsively occurs in a deterministic manner.

Similarly, at time 222, a second isochronous clock pulse 214 changes state in synchronization with system clock 212.

At time 224, the second isochronous clock pulse 214 once more changes state, and isochronous data transfer 216(b) again occurs in a deterministic manner. Therefore, as illustrated in FIG. 2, isochronous data transfers 216(a) and 216(b) typically occur at a pre-determined frequency in network 110. Furthermore, network 110 may cause isochronous data transfers 216(a) and 216(b) to occur before any asynchronous data transfers because of the time-sensitive nature of isochronous data.

Figure 3:
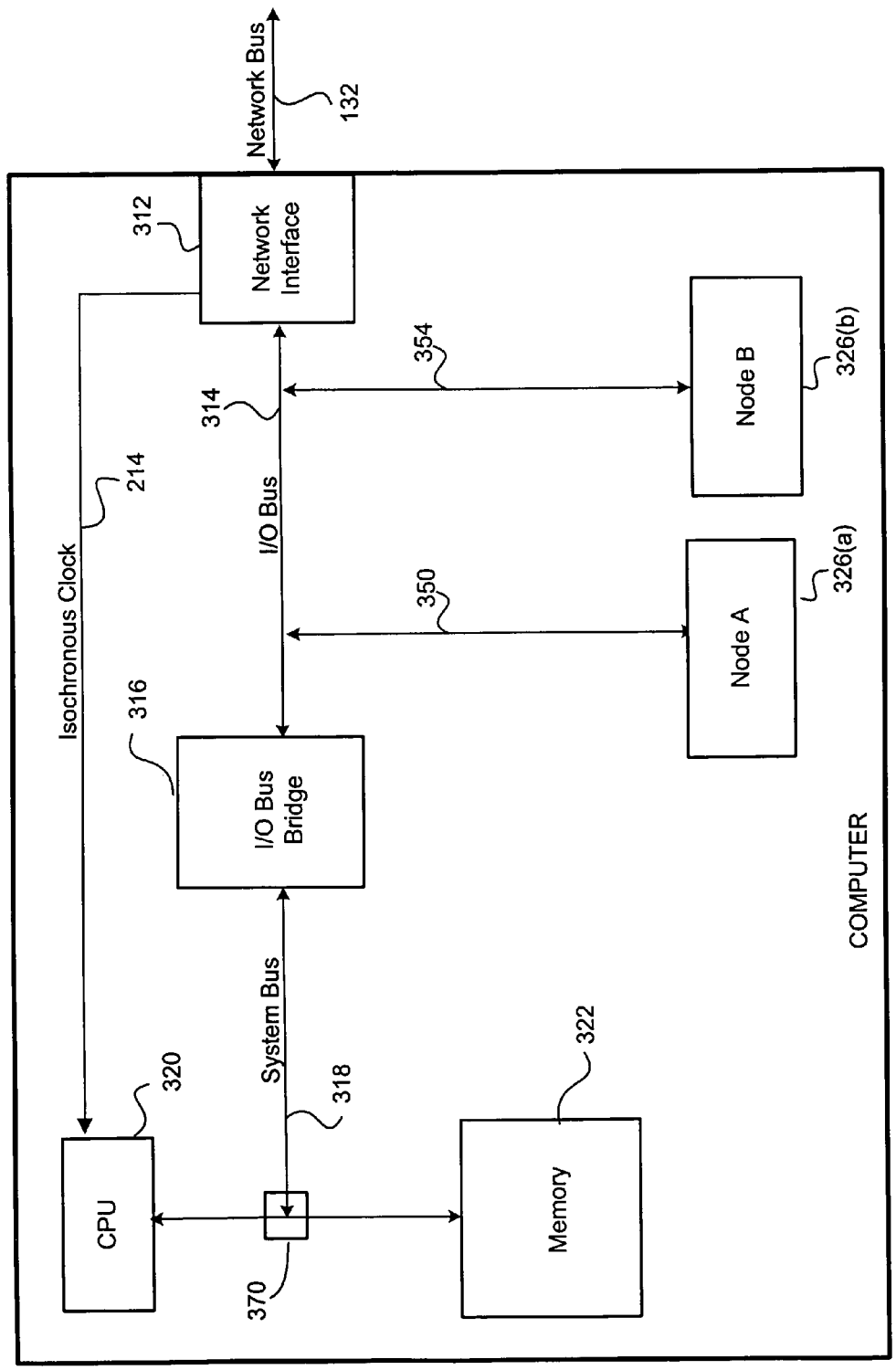
FIG. 3 is a block diagram for one embodiment of the computer of FIG. 1, in accordance with the present invention.

Referring now to FIG. 3, a block diagram for one embodiment of the FIG. 1 computer 116 is shown, in accordance with the present invention. In the FIG. 3 embodiment, computer 116 preferably includes an input/output (I/O) bus 314 for transferring various types of information and data to or from computer 116. In the FIG. 3 embodiment, I/O bus 314 may be implemented according to a Peripheral Component Interconnect (PCI) bus specification that is further described in "PCI Local Bus Specification," Revision 2.1s, 1995, PCI Special Interest Group, which is hereby incorporated by reference. However, in alternate embodiments, I/O bus 314 may be implemented according to any appropriate and compatible specification or standard.

In the FIG. 3 embodiment, a network interface 312 is preferably coupled to both I/O bus 314 and network bus 132 (FIG. 1) to serve as an interface for transferring isochronous data and asynchronous data between computer 116 and network 110. In addition, a node A 326(a) and a node B 326(b) are also coupled to I/O bus 314 via respective paths 350 and 354. In the FIG. 3 embodiment, node A 326(a) and/or node B 326(b) may be integral with computer 116, or, alternately, node A 326(a) and/or node B 326(b) may be external to computer 116. For purposes of illustration and clarity, the FIG. 3 computer 116 shows only two nodes 326, however, in alternate embodiments, computer 116 may include any number of input/output nodes 326.

Node A 326(a) and node B 326(b) preferably may include any desired type of interface, device, circuit, process, or node, including, for example, an MPEG decoder, a display device, an ethernet interface, a printer device, a modem, or a graphics device. Furthermore, computer 116 may alternately be implemented as various other types of electronic devices including, for example, a set-top box or a digital television interface. Computer 116 also includes a central processing unit (CPU) 320, a memory 322, a system bus controller 370, and a system bus 318 that is isolated from I/O bus 314 by an I/O bus bridge 316. In practice, various types of information and data are preferably transferred between memory 322 and I/O bus 314 via system bus 318 and I/O bus bridge 316. In addition, memory 322 preferably communicates bidirectionally with CPU 320 via system bus 318. In the FIG. 3 embodiment, system bus controller 370 preferably coordinates and arbitrates communications over system bus 318 between I/O bus bridge 316 and either CPU 320 or memory 322. In the FIG. 3 embodiment, network interface 312 preferably generates and provides an isochronous clock signal 214 to CPU 320. In other embodiments, computer 116 may be implemented using various other appropriate configurations and architectures.

In the FIG. 3 embodiment, memory 322 preferably includes an asynchronous memory for temporarily storing asynchronous data from various sources. Memory 322 may also preferably include an isochronous memory that may be locked to prevent access by other types of data transfers, and that may also be flexibly reconfigured with regards to selectable attributes such as data size and the number of different isochronous processes that are supported.

As discussed above, isochronous data typically is time-sensitive data that is assigned a high transfer and processing priority to guarantee that the isochronous data deterministically arrives at pre-determined timing intervals and is processed accordingly. Because of the time-sensitive nature of isochronous data, re-transmission of an isochronous data transfer may not be appropriate or possible. For example, if a frame of video data does not reach a display device on network 110 until after the appropriate moment for display of that frame, then re-transmitting the delayed frame is not productive. Sources of isochronous data therefore typically do not repeat unsuccessful isochronous data transmissions. Loss of the foregoing frame of video data may likely cause unwanted jitter or breakup of the corresponding video programming.

Therefore, ensuring the timely and guaranteed processing of isochronous data by CPU 320 becomes a matter of some importance when implementing network 110. In the FIG. 3 embodiment, CPU 320 preferably functions using a plurality of different processor contexts to effectively provide processing resources to multiple tasks or processes. A context may comprise an execution environment that includes any resources that are required to support a given task or process. For example, CPU 320 may require a separate register set for locally storing necessary information to execute program instructions for a particular context. In accordance with the present invention, a certain context may be designed to support deterministic performance of a specific isochronous process.

CPU 320 may therefore advantageously implement concurrent context switching procedures to ensure deterministic performance of isochronous processes, in accordance with the present invention. This method for implementing concurrent context switching is further discussed below in conjunction with FIGS. 4 through 9.

Figure 4:
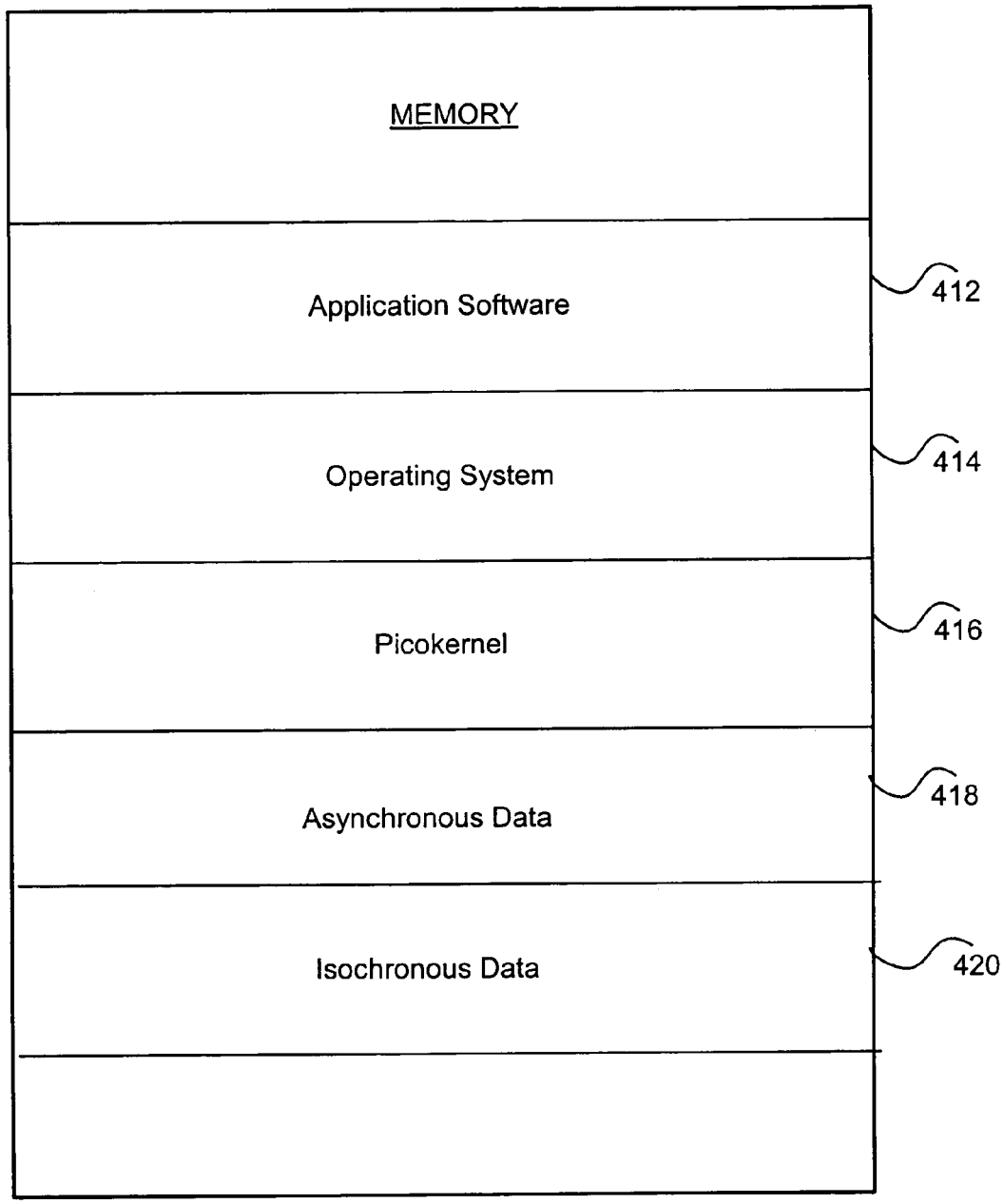
FIG. 4 is a block diagram for one embodiment of the memory of FIG. 3, in accordance with the present invention.

Referring now to FIG. 4, a block diagram for one embodiment of the FIG. 3 memory 322 is shown, in accordance with the present invention. In the FIG. 4 embodiment, memory 322 preferably includes, but is not limited to, application software 412, an operating system 414, a picokernel 416, asynchronous data 418, and isochronous data 420. In alternate embodiments, memory 322 may readily include various other components in addition to, or instead of, the components that are discussed in conjunction with the FIG. 4 embodiment.

In the FIG. 4 embodiment, application software 412 includes software instructions that are preferably executed by CPU 320 (FIG. 3) for performing various functions and operations by computer 116. The particular nature and functionality of application software 412 preferably varies depending upon factors such as the type and purpose of the corresponding host device 116. Application software 412 may include various instructions that cause CPU 320 to instantiate corresponding isochronous processes, in accordance with the present invention.

In the FIG. 4 embodiment, operating system 414 preferably controls and coordinates low-level functionality of device 116. Picokernel 416 preferably manages the scheduling and execution of various isochronous processes and functions, and may be integral with, or separate from, operating system 414. In particular, picokernel 416 may advantageously manage the concurrent context switching procedures of the present invention. The functionality and operation of picokernel 416 is further discussed below in conjunction with FIGS. 5 through 9.

Figure 5:
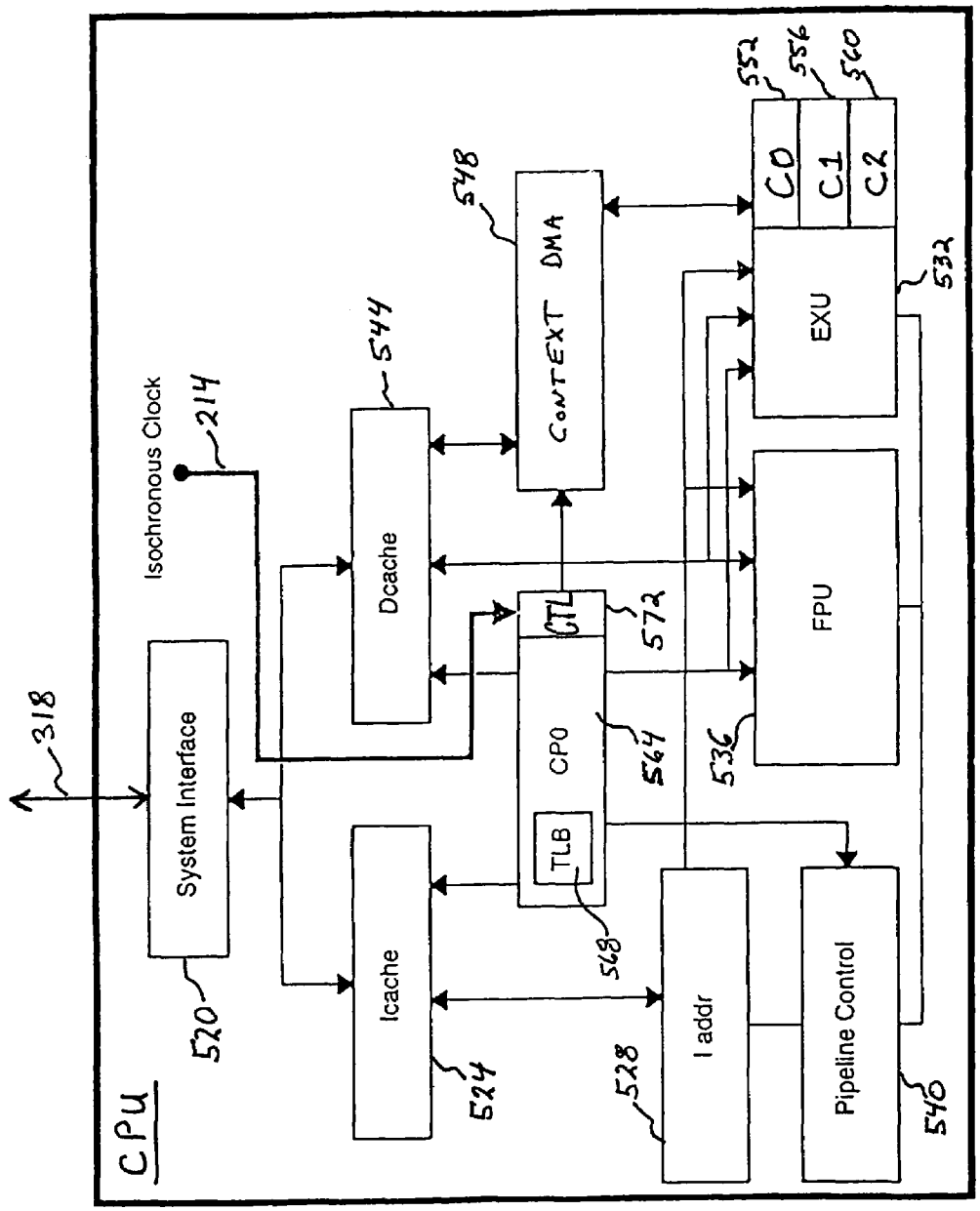
FIG. 5 is a block diagram for one embodiment of the CPU of FIG. 3, in accordance with the present invention.

Referring now to FIG. 5, a block diagram for one embodiment of the FIG. 3 CPU 320 is shown, in accordance with the present invention. In the FIG. 5 embodiment, CPU 320 preferably may include, but is not limited to, a system interface 520, an instruction cache (Icache) 524, an instruction address module (Iaddr) 528, a pipeline control module 540, a floating point unit 536, an execution unit (EXU) 532, a co-processor zero (CP0) 564, a translation look-aside buffer 568, a context control module (CTL) 572, a data cache (Dcache) 544, a context direct-memory-access module (context DMA) 548, a main register set, C0 (552), a first concurrent register set, C1 (556), and a second concurrent register set, C2 (560).

In the FIG. 5 embodiment, portions of CPU 320 may utilize functionalities and structures that are similar to an MIPS RISC architecture. The MIPS RISC architecture is further discussed in MIPS R4000 User's Manual, Joseph Heinrich, Prentice Hall, 1993, which is incorporated herein by reference. In alternate embodiments, CPU 320 may readily be implemented using various other components and architectures instead of, or in addition to, those discussed in conjunction with the FIG. 5 embodiment.

In the FIG. 5 embodiment, system interface 520 preferably coordinates communications between CPU 320 and system bus 318. Icache 524 preferably may receive various program instructions from system interface 520, and then locally store the received program instructions for use by CPU 320. Iaddr 528 preferably may include a program counter for use by CPU 320. Pipeline control module 540 preferably may coordinate and control the execution pipeline for CPU 320. Floating point unit 536 preferably may include a separate co-processor and registers for use by CPU 320.

In the FIG. 5 embodiment, execution unit (EXU) 532 preferably comprises the primary processor block for CPU 320. EXU 532 may also include various appropriate registers and an arithmetic logic unit (ALU). Co-processor zero (CP0) 564 is a separate processor unit that preferably includes various types of control functionality. Translation look-aside buffer 568 preferably may implement various types of memory-mapping functions for CPU 320.

In the FIG. 5 embodiment, data cache (Dcache) 544 may receive various types of data (including isochronous data) from system interface 520, and then locally store the received data for efficient use by CPU 320. In accordance with the present invention, picokernel 416 (FIG. 4) may advantageously manage context control module (CTL) 572, context direct-memory-access module (context DMA) 548, and register sets C0 (552), C1 (556), and C2 (560) to effectively and efficiently perform concurrent context switching and thereby minimize overhead costs for scheduling multiple isochronous processes.

In the FIG. 5 embodiment, CTL 572 preferably includes logic that is necessary to control and coordinate the concurrent context switching procedure of the present invention. For example, CTL 572 may implement concurrent load instructions by instructing context DMA 548 specifically when to load the different contexts. In the FIG. 5 embodiment, context DMA 548 preferably implements a concurrent load operation by concurrently accessing and loading a particular concurrent register set 556 or 560 while the other concurrent register set 556 or 560 is read for actively executing another isochronous process. Context DMA 548 preferably may access information from any appropriate source, including Dcache 544 or memory 322.

Main register set, C0 (552), first concurrent register set, C1 (556), and second concurrent register set, C2 (560) are further discussed below in conjunction with FIG. 6. In addition, the functionality and operation of picokernel 416, context control module (CTL) 572, context DMA 548, and register sets C0 (552), C1 (556), and C2 (560) are further discussed below in conjunction with FIGS. 6 through 9, in accordance with the present invention.

Figure 6:
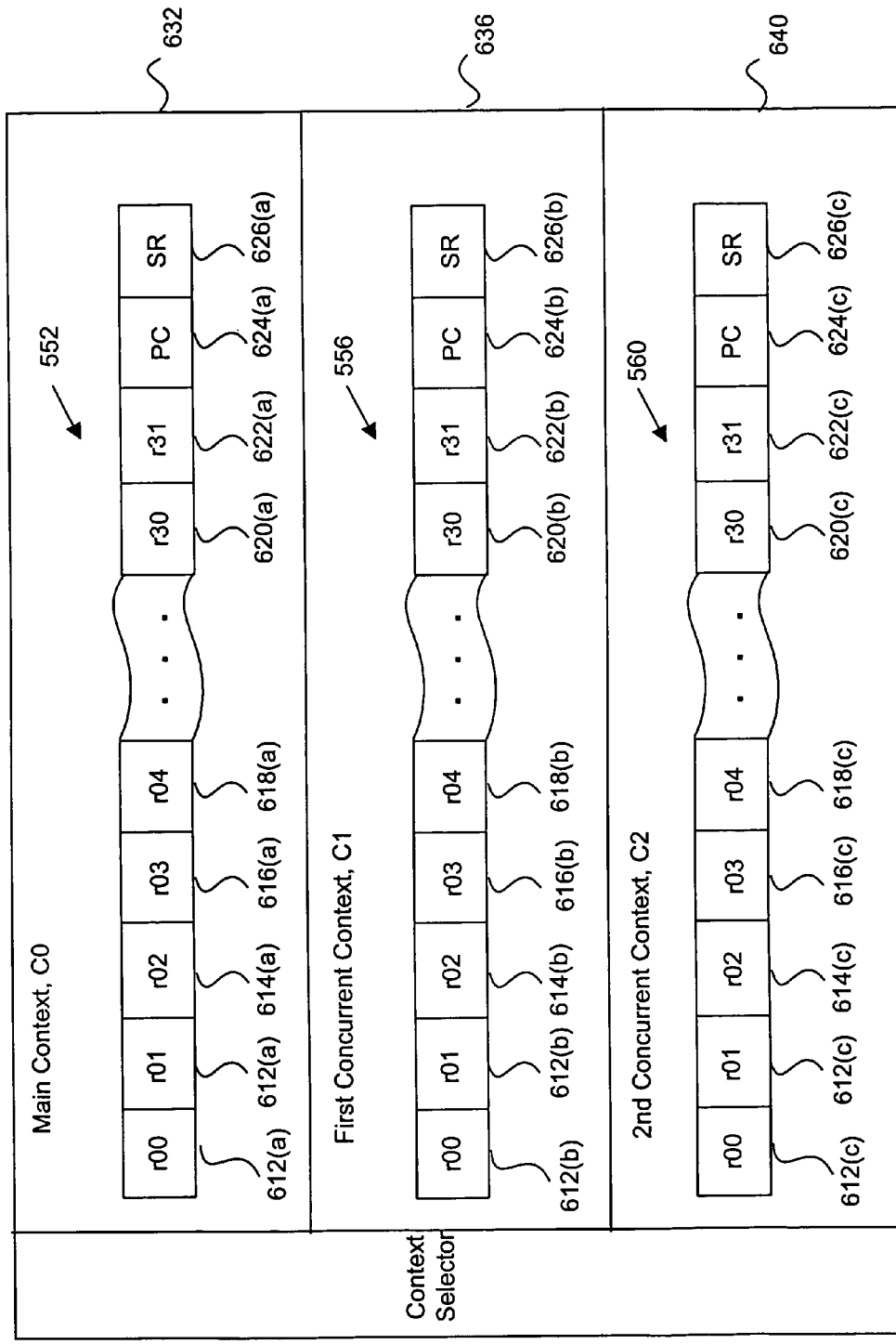
FIG. 6 is a block diagram for one embodiment of the register sets of FIG. 5, in accordance with the present invention.

Referring now to FIG. 6, a block diagram for one embodiment of the FIG. 5 register sets 552, 556, and 560 is shown, in accordance with the present invention. The FIG. 6 embodiment preferably includes, but is not limited to, a main register set, C0 (552) shown as part of main context 632, a first concurrent register set, C1 (556) shown as part of first concurrent context 636, and a second concurrent register set, C2 (560) shown as part of second concurrent context 640. The FIG. 6 embodiment also preferably includes a context selector 628. In alternate embodiments, register sets 552, 556, and 560 may readily be implemented using various other elements instead of, or in addition to, those discussed in conjunction with the FIG. 6 embodiment.

In accordance with the present invention, concurrent context switching comprises a methodology to transparently share a CPU 320 among multiple isochronous and non-isochronous processes. The present invention provides a improved way to minimize the cost of scheduling the foregoing processes. Because isochronous processes run frequently, the cost of scheduling is multiplied. In addition, the cost of scheduling becomes more significant at higher clock rates because of the reduced amount of time available to schedule and execute a given process between successive clock pulses. The present invention therefore proposes to have a new context ready for execution as soon as a current process finishes execution by overlapping the execution of one process and the preparation/loading of the next process.

In the FIG. 6 embodiment, the register sets 552, 556, and 560 preferably may be directly addressed by software instructions and may contain any desired type of information. Main register set, C0 (552) preferably includes thirty-two general-purpose registers r00 (610(a)) through r31 (622(a)) for storing the foregoing information. In addition, register set 552 preferably includes a program counter (PC) 624(a) to indicate the address from which program instructions are fetched for execution, and a status register (SR) 626(a) which stores information that processor logic may access to learn how to execute certain instructions. In the FIG. 6 embodiment, main register set 552 preferably stores various information for performing necessary non-isochronous system tasks and processes by CPU 320.

Similarly, first concurrent register set, C1 (556) preferably includes thirty-two general-purpose registers r00 (610(b)) through r31 (622(b)) for storing information. In addition, register set 556 preferably includes a program counter (PC) 624(b) to indicate the address from which program instructions are fetched for execution, and a status register (SR) 626(b) which stores information that processor logic may access to learn how to execute certain instructions. Likewise, second concurrent register set, C2 (560) preferably includes thirty-two general-purpose registers r00 (610(c)) through r31 (622(c)) for storing the foregoing information. In addition, register set 560 preferably includes a program counter (PC) 624(c) to indicate the address from which program instructions are fetched for execution, and a status register (SR) 626(c) which stores information that processor logic may access to learn how to execute certain instructions.

In the FIG. 6 embodiment, context selector 628 preferably comprises appropriate circuitry for individually accessing and communicating with register sets 552, 556, and 560. For example, context selector 628 may individually access the register sets 552, 556, and 560 via appropriate input/output paths to perform load operations and switch operations, in accordance with the present invention. Context selector 628 may be implemented using any suitable configuration. For example, in certain embodiments, context selector 628 may include one or more multiplexer devices to selectably communicate with register sets 552, 556, and 560.

Figure 7:
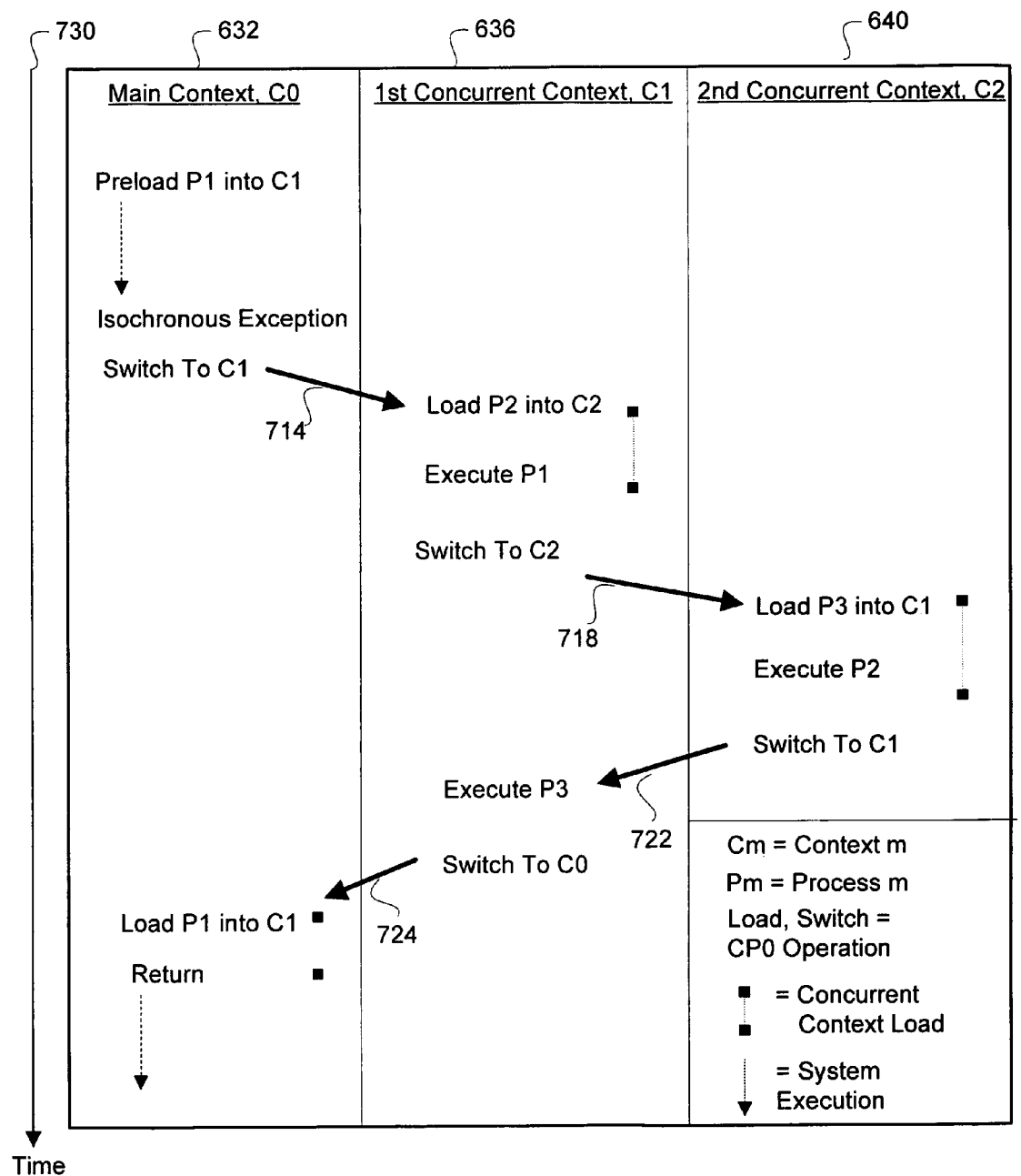
FIG. 7 is a timing diagram that illustrates an exemplary sequence for utilizing concurrent context switching, in accordance with one embodiment of the present invention.

Referring now to FIG. 7, a timing diagram 710 that illustrates an exemplary sequence for utilizing concurrent context switching is shown, in accordance with one embodiment of the present invention. The FIG. 7 embodiment is presented for purposes of illustration, and in other embodiments, the present invention may be practiced using various other implementations, sequences, and configurations. For example, the present invention may readily be utilized to support a different number of isochronous processes than the three processes shown in the FIG. 7 embodiment.

In the FIG. 7 embodiment, timing diagram 710 preferably includes a main context, C0 (632), a first concurrent context, C1 (636), and a second concurrent context, C2 (640). Timing diagram 710 also includes a legend in the bottom right corner to define terminology in the FIG. 7 embodiment. For example, Cm means context m, Pm means process m, load and switch are co-processor zero operations, a dotted line with square ends means concurrent context load, and a dashed line with an arrow on one end means system execution.

On the far left of the FIG. 7 timing diagram 710, a time axis 730 is shown to illustrate the passage of time starting at the top of timing diagram 710 and ending at the bottom of timing diagram 710. Therefore, the sequence of events in timing diagram 710 begins with "preload P1 into C1", in the top left corner of timing diagram 710, and flows through context switches 714, 718, 722, and 724, to end with "return" followed by system execution in the bottom left corner of timing diagram 710. The FIG. 7 timing diagram 710 may be referred to in conjunction with the flowcharts of FIGS. 8 and 9 to further illustrate and clarify the operation of the present invention while supporting concurrent context switching for three isochronous processes.

In accordance with the present invention, concurrent context switching is designed to solve the problem of responding to frequently recurring (from a software perspective) interrupts (e.g., 8 KHz). These interrupts are a part of systems that handle isochronous data. Normal interrupt handling is designed to process unpredictable interrupts that occur because an external device requires service from the operating system. Isochronous interrupts are regular in their occurrence, therefore can be treated in a more deterministic fashion. Concurrent context switching takes advantage of this behavior by introducing an effective concurrency mechanism that reduces the latency for context switching.

A goal of concurrent context switching is to achieve transparent context switching for a distinct class of very low-latency interrupt processes. A current execution context is not disturbed by the preparation of the next-to-execute context. In one embodiment, the foregoing approach may include at least three hardware context representations. The architectural model is to have a "main" or base system context that is used for normal process management, and two concurrent contexts used for immediate context switching. There may be more processes associated with the isochronous interrupt than there are contexts.

The context of interest is the lowest-level processor context, with the minimal level of information necessary to switch execution. For the MIPS RISC architecture, this may include the integer registers, program counter, and, possibly, some co-processor zero registers. The base context is the system level context, which is used for standard interrupt and process scheduling. The remaining contexts are for concurrent context switching. One objective of the concurrent context switching mechanism is to minimize the cost of a context switch by taking advantage of concurrency.

This objective means that context data may be moved concurrently by the context switching mechanism into a dormant context while another context is active. This approach allows a ping-pong approach to context switching. Initially, there is a pre-filled context for immediate use, which causes a second context to be readied for use when the first context completes. While the second context is in use, the first may be readied for the third instance of context switching. After all of the contexts are processed, the first context may be pre-loaded for the next occurrence of the interrupt. Upon completion of all low latency interrupt handling, the base context may be re-activated.

Software manipulation of the main and concurrent contexts may be done by using a context control module from the co-processor zero interface. These operations preferably are available in kernel mode. Three register sets may preferably be used: one to initiate concurrent context loading from memory, and two to switch to a context. A concurrent context may be loaded by memory read operations performed concurrently with processor operation. Concurrent contexts preferably may be loaded by co-processor zero operations. Any storing of context information may be performed synchronously by software.

In accordance with the present invention, several different operation may be utilized to implement concurrent context switching. These operations preferably may include the following switch operation.

MTC0 RCTXSWITCH,rd switch to execution CONTEXT[rd]

The foregoing switch operation preferably may function like an absolute jump to the program counter of the activated context. If a target context is not ready (e.g., a load is in progress), the CPU 320 may stall until the target context is ready. A switch of context preferably causes the CPU pipeline to be flushed prior to beginning the selected context.

The foregoing operations also preferably may include the following select operation that causes the selection of a context for loading.

MTC0 RCTXSELECT,rd select CONTEXT[rd] for loading

The foregoing operations also preferably may include the following load operation. The load operation initiates a concurrent load of the selected context from memory. The address of the context information is used to load the selected context concurrently, while continuing execution in the current context.

MTC0 RCTXLOAD,rd load CONTEXT[RCTXSELECT] concurrently from memory at rd

The FIG. 7 embodiment therefore provides an example scenario for the use of the foregoing operations by a handler for very low-latency exceptions (VLLE), such as those needed by isochronous interrupt processing.

In certain embodiments, the described concurrent context switching method can be implemented in a MIPS core by adding a special purpose DMA engine to co-processor zero. In addition, an array of general-purpose registers equal to three times the standard general-purpose registers, plus program counter and status register, needs to be implemented with a data path for execution usage and a data path for concurrent loading. The process of loading preferably interlocks the use of the context for execution, potentially causing a processor stall. The FIG. 7 embodiment design preferably assumes that a single isochronous exception uses the concurrent process switching, and is preferably designed to execute multiple, run-time configurable isochronous processes. System software preferably has the task of managing the contexts that are operated on by the mechanism of the FIG. 7 embodiment.

The foregoing FIG. 7 technique may also be applied to the design of an interrupt coprocessor by having an intelligent DMA engine that selects and loads an available context for the purpose of implementing a prioritized interrupt scheme. This approach may require the addition of a context saving operation when the number of hardware contexts is less than the number of interrupt processes. The intelligent interrupt processor may transparently and concurrently manage the context switching processing, and cause an "interrupt" that is an intelligent context switch by signaling the processor to switch execution to the desired context. The foregoing approach may operate in parallel with the previously discussed concurrent context switching.

The present invention therefore advantageously allows the cost of context switching for low-latency interrupt handling (such as that associated with clock synchronized processing) to be minimized. In addition, the latency for traditional interrupts may be minimized through the use of an intelligent interrupt coprocessor through offloading the basic processing for interrupt context switching Referring now to FIG. 8, a flowchart of exemplary method steps for instantiating isochronous processes is shown, in accordance with one embodiment of the present invention. The FIG. 8 example is presented for purposes of illustration, and, in alternate embodiments, the present invention may readily instantiate isochronous processes using various other steps and sequences than those discussed in conjunction with the FIG. 8 embodiment. For example, the FIG. 8 embodiment discusses instantiating three isochronous processes. However, in alternate embodiments, computer 116 may instantiate any desired number of isochronous processes, in accordance with the present invention.

Figure 8:
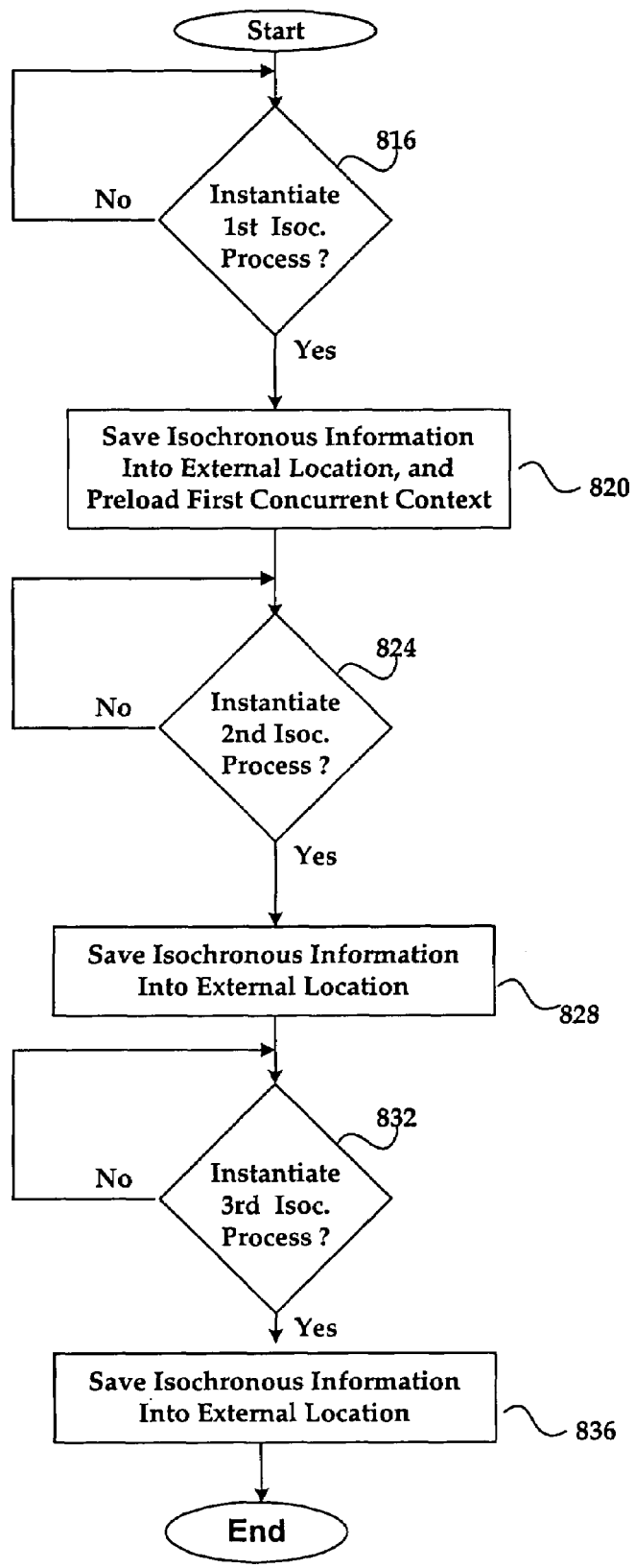
FIG. 8 is a flowchart of exemplary method steps for instantiating isochronous processes, in accordance with one embodiment of the present invention.

In the FIG. 8 embodiment, initially, in step 816, CPU 320 determines whether to instantiate a first isochronous process (P1 of FIG. 7). An isochronous process may be instantiated by any appropriate entity. For example, an isochronous process may be instantiated by a request from software instructions such as application software 412 (FIG. 4), or from appropriate system user input. An isochronous process may also be instantiated by transmission of isochronous information to I/O bus 314 (FIG. 3) from sources such as network bus 132 or from node A 326(a) or node B 326(b).

If a first isochronous process is instantiated, then, in step 820, a first set of isochronous information is preferably transmitted to system bus 318 (FIG. 3) via I/O bus 314 and I/O bus bridge 316. CPU 320 may preferably save the first set of isochronous information into an appropriate external location such as memory 322. In addition, network interface 312 preferably identifies the incoming isochronous information, and responsively transmits an isochronous clock signal 214 to context control module 572 in CPU 320.

In response, context control module 572 preferably begins execution of picokernel 416 (FIG. 4) to manage the isochronous process, including managing the associated concurrent context switching procedure. In accordance with the present invention, context control module 572 then may preferably cause context DMA 548 to preload the previously-received first set of isochronous information into first concurrent register set 556 of the first concurrent context 636.

Next, in step 824, CPU 320 determines whether to instantiate a second isochronous process (P2 of FIG. 7). If a second isochronous process is instantiated, then, in step 828, a second set of isochronous information is preferably transmitted to system bus 318 (FIG. 3) via I/O bus 314 and I/O bus bridge 316. CPU 320 may preferably save the second set of isochronous information into an appropriate external location such as memory 322.

Finally, in step 832, CPU 320 determines whether to instantiate a third isochronous process (P3 of FIG. 7). If a third isochronous process is instantiated, then, in step 836, a third set of isochronous information is preferably transmitted to system bus 318 (FIG. 3) via I/O bus 314 and I/O bus bridge 316. CPU 320 may preferably save the third set of isochronous information into an appropriate external location such as memory 322, and the FIG. 8 method terminates.

Figure 9A:
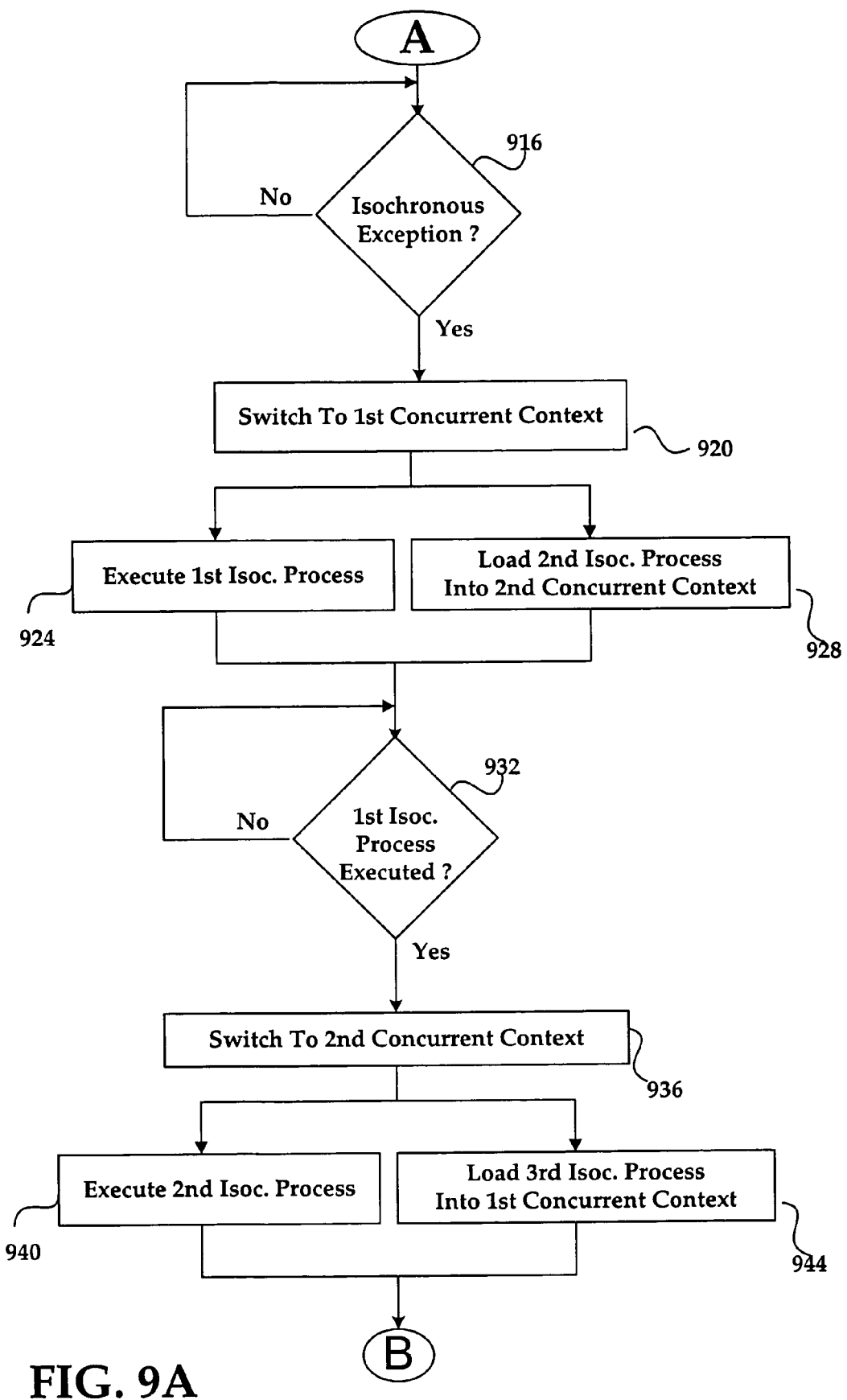
FIGS. 9A and 9B together constitute a flowchart of exemplary method steps for utilizing concurrent context switching, in accordance with one embodiment of the present invention.
Figure 9B:
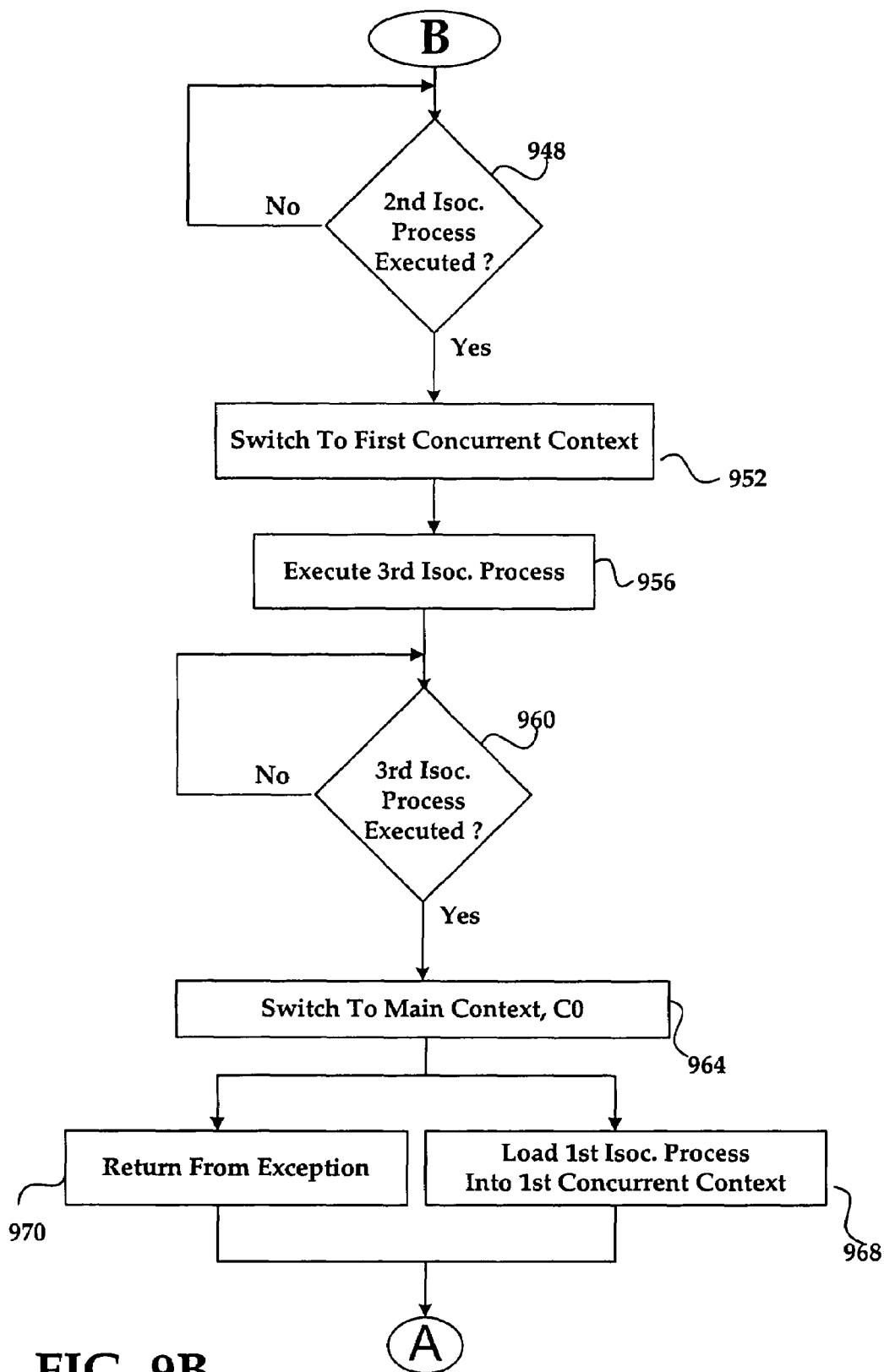

Referring now to FIGS. 9A and 9B (hereinafter, FIG. 9), a combined flowchart of exemplary method steps for utilizing concurrent context switching is shown, in accordance with one embodiment of the present invention. The FIG. 9 example is presented for purposes of illustration, and, in alternate embodiments, the present invention may readily perform concurrent context switching using various other steps and sequences than those discussed in conjunction with the FIG. 9 embodiment.

For example, the FIG. 9 embodiment discusses three isochronous processes. However, in alternate embodiments, any desired number of isochronous processes may utilize concurrent context switching, in accordance with the present invention. The methods steps discussed in conjunction with FIG. 9 may provide further illustration of the concurrent context switching sequence that was previously presented in timing diagram 710 of FIG. 7.

In the FIG. 9 embodiment, CPU 320 may initially be executing various non-isochronous system tasks in main context 632 using main register set 552. For purposes of illustration, it is assumed that three isochronous processes have been instantiated and that a set of information for a first isochronous process (P1) has been preloaded into first concurrent register set C1 (556), as discussed above in conjunction with FIG. 8.

In step 916, context control module 572 in CPU 320 preferably waits for the occurrence of an isochronous exception. In the FIG. 9 embodiment, the isochronous exception may preferably be triggered by an isochronous clock pulse 214 from network interface 312 to thereby signal the start of a new isochronous cycle. In response to the foregoing isochronous exception, CPU 320 preferably interrupts system execution in main context 632, and context control module 572 preferably then causes context selector 628 to switch processor contexts to first concurrent context 636.

Next, as shown in the FIG. 9 flowchart, steps 924 and 928 are performed concurrently. In step 924, CPU 320 preferably executes the preloaded first isochronous process, and, concurrently, in step 928, context control module 572 preferably causes context DMA 548 to load a set of information corresponding to a second isochronous process (P2) into second concurrent register set C2 (560). In step 932, CPU 320 then determines whether the first isochronous process has completed execution.

If the first isochronous process has completed execution, then, in step 936, context control module 572 preferably then causes context selector 628 to switch processor contexts to second concurrent context 640. Next, as shown in the FIG. 9 flowchart, steps 940 and 944 are performed concurrently. In step 940, CPU 320 preferably executes the second isochronous process, and, concurrently, in step 944, context control module 572 preferably causes context DMA 548 to load a set of information corresponding to a third isochronous process (P3) into first concurrent register set C1 (556). The FIG. 9A method steps then advance to reference "B", and the FIG. 9 flowchart continues with the FIG. 9B method steps which follow the reference "B".

In step 948, CPU 320 determines whether the foregoing second isochronous process has completed execution. If the second isochronous process has completed execution, then, in step 952, context control module 572 preferably causes context selector 628 to switch processor contexts to first concurrent context 636. Next, in step 956, CPU 320 preferably executes the third isochronous process. In the FIG. 9 embodiment, three isochronous processes and two concurrent contexts are discussed for purposes of illustration. However, the present invention may readily support any number of isochronous processes using any desired number of concurrent contexts.

For example, if more than three isochronous processes were instantiated in the FIG. 9 embodiment, context control module 572 may readily perform a similar concurrent context switching procedure by alternating between first concurrent context 636 and second concurrent context 640 to thereby support any number of isochronous processes in the manner used for the three isochronous processes of FIG. 9.

In step 960, CPU 320 determines whether the foregoing third isochronous process has completed execution. If the third isochronous process has completed execution, then, in step 964, since the FIG. 9 example utilizes only three isochronous processes, context control module 572 preferably causes context selector 628 to switch processor contexts to main context 632. In steps 968, context control module 572 then preferably directs context DMA 548 to load a next set of information corresponding to the first isochronous process (P1) into first concurrent register set C1 (556), while concurrently, in step 970, CPU 320 generates a return from the isochronous exception of foregoing step 916, and recommences the execution of system tasks. The FIG. 9 flowchart then returns to step 916, where context control module 572 of CPU 320 preferably waits for the occurrence of another isochronous exception to retrigger the FIG. 9 procedure.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing a concurrent context switching procedure, comprising:
a main context that is configured to support system execution tasks;
a first concurrent context that supports first concurrent procedures;
a second concurrent context that supports second concurrent procedures;
a context control module that switches between said main context, said first concurrent context, and said second concurrent context; and
a processor that executes said first concurrent procedures and said second concurrent procedures in an uninterrupted sequence while said context control module simultaneously preloads isochronous information needed for executing future processes that are executed after said first concurrent procedures and said second concurrent procedures have been completed.

2. The system of claim 1 wherein said first concurrent context and said second concurrent context support isochronous processes for handling time-sensitive isochronous information.

3. The system of claim 1 wherein said concurrent context switching procedure occurs in one of a computer device, a set-top box, an electronic network device, and a consumer electronic device.

4. The system of claim 1 wherein said system for performing said concurrent context switching procedure is part of an electronic network that is implemented according to an IEEE 1394 serial bus standard.

5. The system of claim 1 wherein a picokernel module manages said context control module to perform said concurrent context switching procedure.

6. The system of claim 1 wherein said first concurrent procedures include executing a first process in said first concurrent context while concurrently loading a second process into said second concurrent context, and wherein said second concurrent procedures include executing said second process in said second concurrent context while concurrently loading a third process into said first concurrent context.

7. The system of claim 6 wherein said context control module alternately repeats additional first concurrent procedures and additional second concurrent procedures after executing said first process and said second process to sequentially support additional processes.

8. The system of claim 1 wherein said main context includes a main register set, said first concurrent context includes a first concurrent register set, and said second concurrent context includes a second concurrent register set.

9. The system of claim 8 wherein said context control module, said main register set, said first concurrent register set, and said second concurrent register set are included in a central-processing unit of an electronic device.

10. The system of claim 8 wherein each of said main register set, said first concurrent register set, and said second concurrent register set includes a series of general purpose registers, a program counter register, and a status register.

11. The system of claim 9 wherein first information corresponding to a first process is preloaded into said first concurrent register set while said system execution tasks are being executed by using said main register set of said main context.

12. The system of claim 11 wherein said context control module causes a context selector to switch to said first concurrent register set of said first concurrent context in response to an isochronous exception, said isochronous exception being triggered by an isochronous clock signal generated from a network interface to said context control module.

13. The system of claim 12 wherein said first process is executed in said first concurrent context while said context control module concurrently causes a context DMA device to load second information corresponding to a second process into said second concurrent register set of said second concurrent context.

14. The system of claim 13 wherein said context control module causes said context selector to switch to said second concurrent register set of said second concurrent context when said first process has been executed.

15. The system of claim 14 wherein said second process is executed in said second concurrent context while said context control module concurrently causes said context DMA device to load third information corresponding to a third process into said first concurrent register set of said first concurrent context.

16. The system of claim 15 wherein said context control module causes said context selector to switch to said first concurrent register set of said first concurrent context when said second process has been executed.

17. The system of claim 16 wherein said third process is executed in said first concurrent context.

18. The system of claim 17 wherein said context control module causes said context selector to switch to said main register set of said main concurrent context when said third process has been executed.

19. The system of claim 17 wherein said context control module continues to perform said concurrent context switching procedure by alternating between said first concurrent context to support said first concurrent procedures and said second concurrent context to support said second concurrent procedures, to thereby sequentially support any additional processes.

20. The system of claim 18 wherein said context control module loads new first information for said first process into said first concurrent register set, said central-processing unit then returning from said isochronous exception to perform said system execution tasks until a new isochronous exception retriggers said concurrent context switching procedure.

21. A method for performing a concurrent context switching procedure, comprising the steps of:
performing system execution tasks in a main context;
performing first concurrent procedures in a first concurrent context;
performing second concurrent procedures in a second concurrent context;
switching between said main context, said first concurrent context, and said second concurrent context by using a context control module; and
executing said first concurrent procedures and said second concurrent procedures with a processor in an uninterrupted sequence while said context control module simultaneously preloads isochronous information needed for executing future processes that are executed after said first concurrent procedures and said second concurrent procedures have been completed.

22. The method of claim 21 wherein said first concurrent context and said second concurrent context support isochronous processes for handling time-sensitive isochronous information.

23. The method of claim 21 wherein said concurrent context switching procedure occurs in one of a computer device, a set-top box, an electronic network device, and a consumer electronic device.

24. The method of claim 21 wherein said system for performing said concurrent context switching procedure is part of an electronic network that is implemented according to an IEEE 1394 serial bus standard.

25. The method of claim 21 wherein a picokernel module manages said context control module to perform said concurrent context switching procedure.

26. The method of claim 21 wherein said first concurrent procedures include executing a first process in said first concurrent context while concurrently loading a second process into said second concurrent context, and wherein said second concurrent procedures include executing said second process in said second concurrent context while concurrently loading a third process into said first concurrent context.

27. The method of claim 26 wherein said context control module alternately repeats additional first concurrent procedures and additional second concurrent procedures after executing said first process and said second process to sequentially support additional processes.

28. The method of claim 21 wherein said main context includes a main register set, said first concurrent context includes a first concurrent register set, and said second concurrent context includes a second concurrent register set.

29. The method of claim 28 wherein said context control module, said main register set, said first concurrent register set, and said second concurrent register set are included in a central-processing unit of an electronic device.

30. The method of claim 28 wherein each of said main register set, said first concurrent register set, and said second concurrent register set includes a series of general purpose registers, a program counter register, and a status register.

31. The method of claim 29 wherein first information corresponding to a first process is preloaded into said first concurrent register set while said system execution tasks are being executed by using said main register set of said main context.

32. The method of claim 31 wherein said context control module causes a context selector to switch to said first concurrent register set of said first concurrent context in response to an isochronous exception, said isochronous exception being triggered by an isochronous clock signal generated from a network interface to said context control module.

33. The method of claim 32 wherein said first process is executed in said first concurrent context while said context control module concurrently causes a context DMA device to load second information corresponding to a second process into said second concurrent register set of said second concurrent context.

34. The method of claim 33 wherein said context control module causes said context selector to switch to said second concurrent register set of said second concurrent context when said first process has been executed.

35. The method of claim 34 wherein said second process is executed in said second concurrent context while said context control module concurrently causes said context DMA device to load third information corresponding to a third process into said first concurrent register set of said first concurrent context.

36. The method of claim 35 wherein said context control module causes said context selector to switch to said first concurrent register set of said first concurrent context when said second process has been executed.

37. The method of claim 36 wherein said third process is executed in said first concurrent context.

38. The method of claim 37 wherein said context control module causes said context selector to switch to said main register set of said main concurrent context when said third process has been executed.

39. The method of claim 37 wherein said context control module continues to perform said concurrent context switching procedure by alternating between said first concurrent context to support said first concurrent procedures and said second concurrent context to support said second concurrent procedures, to thereby sequentially support any additional processes.

40. The method of claim 38 wherein said context control module loads new first information for said first process into said first concurrent register set, said central-processing unit then returning from said isochronous exception to perform said system execution tasks until a new isochronous exception retriggers said concurrent context switching procedure.

41. The method of claim 40 wherein said central-processing unit enters a stall condition when a load procedure is not completed before said context control module attempts a switch procedure to a new concurrent context.

42. The method of claim 21 wherein said context control module controls a select operation, a load operation, and a switch operation, and wherein said concurrent context switching procedure utilizes one or more supplemental concurrent contexts in addition to said first concurrent context and said second concurrent context.

43. A computer-readable medium comprising program instructions for performing a concurrent context switching procedure by performing the steps of:
   performing system execution tasks in a main context;
   performing first concurrent procedures in a first concurrent context;
   performing second concurrent procedures in a second concurrent context;
   switching between said main context, said first concurrent context, and said second concurrent context by using a context control module; and
   executing said first concurrent procedures and said second concurrent procedures with a processor in an uninterrupted sequence while said context control module simultaneously preloads isochronous information needed for executing future processes that are executed after said first concurrent procedures and said second concurrent procedures have been completed.

44. A system for performing a concurrent context switching procedure, comprising:
   means for performing system execution tasks in a main context;
   means for performing first concurrent procedures in a first concurrent context;
   means for performing second concurrent procedures in a second concurrent context; and
   means for controlling switching procedures between said main context, said first concurrent context, and said second concurrent context.

45. A central processing unit for performing a concurrent context switching procedure, comprising:
   a main context register that stores system data for a main context for supporting system execution tasks;
   a first concurrent context register that is preloaded with first isochronous data for a first concurrent context;
   a second concurrent context register that is preloaded with second isochronous data for a second concurrent context; and
   a context control module that controls switching procedures between said main context register, said first concurrent context register, and said second concurrent context register, said context control module alternately preloading additional sets of said first isochronous data into said first concurrent context register and additional sets of said second isochronous data into said second concurrent context register.

46. The system of claim 45 wherein said first concurrent context register and said second concurrent context register store isochronous data, said first concurrent context register and said second concurrent context register storing no program instructions.

47. The system of claim 45 wherein said first concurrent context register and said second concurrent context register include integer register values, program counter values, and co-processor zero register values.

48. The system of claim 45 wherein said context control module utilizes said first concurrent context register and said second concurrent context register in an alternating manner to sequentially support any number of isochronous processes.

49. The system of claim 45 further comprising a data cache that receives and temporarily stores said system data, said first isochronous data, said second isochronous data, and said additional sets of isochronous data for preloading into corresponding ones of said main context register, said first concurrent context register, and said second concurrent context register.

50. The system of claim 49 further comprising an execution unit and an instruction cache that is dedicated for receiving and storing program instructions that are executed by said execution unit to utilize pre-loaded context data stored in said main context register, said first concurrent context register, and said second concurrent context register.

51. The system of claim 49 further comprising a context DMA that said context control module instructs to preload said system data, said first isochronous data, said second isochronous data, and said additional sets of isochronous data from said data cache into corresponding ones of said main context register, said first concurrent context register, and said second concurrent context register.

52. The system of claim 44 wherein said central processing unit executes isochronous processes in an uninterrupted sequence without said central processing unit entering into an idle condition.

* * * * *